United States Patent [19]
Pratt, Jr.

[11] 4,020,388
[45] Apr. 26, 1977

[54] DISCHARGE DEVICE

[75] Inventor: George W. Pratt, Jr., Wayland, Mass.

[73] Assignee: Massachusetts Institute of Technology, Cambridge, Mass.

[22] Filed: Sept. 23, 1974

[21] Appl. No.: 508,381

[52] U.S. Cl. .............................. 315/58; 123/143 B; 123/169 MG; 123/169 PA; 313/123; 313/139; 313/140; 313/141; 315/52; 315/53

[51] Int. Cl.² .................................. H01T 13/20

[58] Field of Search ............. 315/52, 53, 58; 313/123, 139, 140, 141; 123/143 B, 169 MG, 169 PA

[56] References Cited
UNITED STATES PATENTS

| | | | |
|---|---|---|---|
| 1,090,815 | 3/1914 | Harter | 313/123 |
| 1,138,372 | 5/1915 | Gilbert | 313/123 |
| 3,538,372 | 11/1970 | Terao | 313/142 X |
| 3,842,818 | 10/1974 | Cowell et al. | 313/139 X |
| 3,842,819 | 10/1974 | Atkins et al. | 313/139 X |

*Primary Examiner*—Rudolph V. Rolinec
*Assistant Examiner*—Darwin R. Hostetter
*Attorney, Agent, or Firm*—Arthur A. Smith, Jr.; Robert Shaw; Martin M. Santa

[57] ABSTRACT

A discharge device for igniting a fuel-air mixture whereby fuel droplets in the mixture are electrically charged and, under the influence of an electric field, caused to congregate at a region thereby concentrating the mixture at said region, means being provided to create an arc at said region. A device of more general use is also disclosed.

18 Claims, 10 Drawing Figures

DISCHARGE DEVICE

The present invention relates to spark plugs and the like and to discharge devices of a more general nature.

Of interest in connection with this specification are the following texts, etc.: Lord Rayleigh, Proc. Lond. Math. Soc. 10, 4 (1878); J. Lawton and F. J. Weinburg, "Electrical Aspects of Combustion," Clarendon Press, Oxford (1969); U.S. Pat. No. 895,729 (Cottrell, 1908); H. G. White, "Industrial Electrostatic Precipitation," Addison Wesley, Redding, Mass. (1963); F. H. Merrill and A. von Hippel, "The Atomphysical Interpretation of Lichtenberg Figures and their Application to the Study of Gaseous Discharge Phenomenon," J. Appl. Phys. 10, 873 (1939); Heywood et al., "Prediction of Nitric Oxide Concentration in an S. I. Engine Compared with Exhaust Measurements," S.A.E. preprint 710011 (Jan. 11, 1971); G. A. Lavoie, et al., "Experimental and Theoretical Study of Nitric Oxide Formation in Internal Combustion Engines," Comb. Sci. and Tech. 1, 313 (1970); NASA Report 1300, "Basic Consideration in Combustion of Hydrocarbon Fuels with Air," prepared by Propulsion Chemistry Division, Lewis Flight Center, (1957); B. Lewis, "Molecular Science and Engineering," M.I.T. Press 1959 (see chapter 7 — "Explosions in Gaseous Systems"); Harold Edgerton, "Electronic Flash Strobe", McGraw Hill, Inc., (1970); an article entitled "Electrostatics" (Moore) March 1972, Scientific American, pages 47, et seq.; and an article entitled "Large Aperture $CO_2$ Laser Discharge" (Richardson et al.) IEEE Journal of Quantum Electronics, Vol. QE9, No. 9, Sept. 1973, pages 934–939.

No discussion need be made here of the great present need for some system to enhance combustion in combustion engines in a way that will reduce the amount and change the character of pollutants emitted therefrom. Such reduction can be effected by using a lean fuel-air mixture, but ignition is then a problem. Thus, Honda has provided a two-chamber system wherein an enriched fuel-air mixture is ignited in a small chamber and the flame spreads to a lean mixture in the main combustion chamber. An object of the present invention is to provide a spark plug that will itself, when appropriately electrically energized, serve both to enrich the mixture and then to ignite the thereby enriched mixture.

Another object is to provide a discharge device of more general use as well.

These and still further objects are discussed hereinafter.

The objects of the invention are achieved in a discharge device having an electrode arrangement that, when the device is appropriately electrically energized, will establish a corona in a fuel-air mixture thereby to charge fuel droplets, will cause migration of charged fuel droplets in the mixture under the influence of an electric field to a region, and will ignite the thusly enriched mixture at that region. In a preferred embodiment, an array of electrodes serves both to collect and to ignite the mixture; such array has use, also, in more general systems.

The invention is hereinafter discussed with reference to the accompanying drawing in which.

This invention arose essentially from several related discoveries by the inventor, a number of which are now discussed. First, a corona discharge can be maintained in a combustible fuel-air mixture (e.g., gasoline and air) without producing ignition. The confirming experiment was performed in the Laboratory for Insulation Research at the Massachusetts Institute of Technology, Cambridge, Massachusetts. Fuel was allowed to drip through a hollow center electrode of approximately 1 mm diameter surrounded by a concentric cylindrical electrode of opposite polarity, approximately 1.5 cm in diameter. A 12 kV a-c voltage between center- and outer-electrodes created a vigorous blue corona discharge. The fuel droplets were violently agitated by the corona and were held suspended near the wall of the outer electrode. However, ignition did not take place until, at a sufficiently high voltage, an arc discharge formed. The effect of electric fields on liquid droplets has been studied since the work of Lord Rayleigh in 1878 and is discussed in detail by Lawton and Weinburg in their excellent text. The present results are in keeping with the earlier work with the additional observation that a highly combustible mixture can be subjected to a corona discharge and not ignite. Another discovery is that fuel droplets, in the fuel-air mixture in an automobile engine, and even in the short time available at high engine speeds, can be caused to migrate under the influence of an electric field and to provide a region of enriched ignition mixtures. Still another discovery is that an arc can be produced across a gap the order of a cm even at pressures of ten atmospheres as are encountered in combustion engines.

The discoveries enumerated above (and others) form the basis for an electrical discharge device that establishes a corona discharge in a fuel-air mixture consequently charging some of the fuel droplets. The charged droplets are moved toward a collecting electrode or electrodes by an electric field, usually the same field associated with establishing the corona discharge. In the region about the collecting electrode of electrodes the fuel-air ratio is enriched. The geometry of the enriched region is largely determined by the nature of the collecting electrode or electrodes and, in the present system, is usually extended in space and not at a single point. Establishing an arc discharge to, among or in the vicinity of the collecting electrode or electrodes effects combustion of the enriched mixture. The multiple arc concept herein discussed allows ignition of the enriched mixture at more than one side in the enriched region. Although a single ignition site would be effective, multiple ignition sites are much more effective when the ignition of any lean mixture is desired. In the explanation below, an attempt is made to apply the same or similar designations to elements that perform the same or similar functions in the apparatus described.

Figure 1:
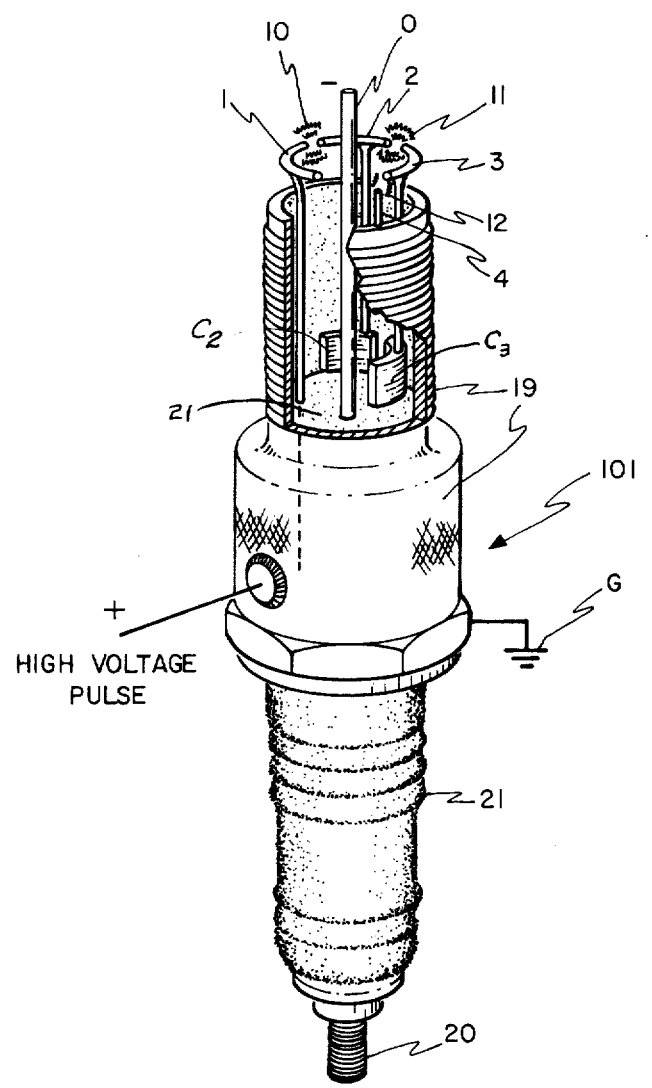
FIG. 1 is an isometric view, partly cutaway, showing a preferred form of a spark plug embodying the inventive concepts herein disclosed.
Figure 2:
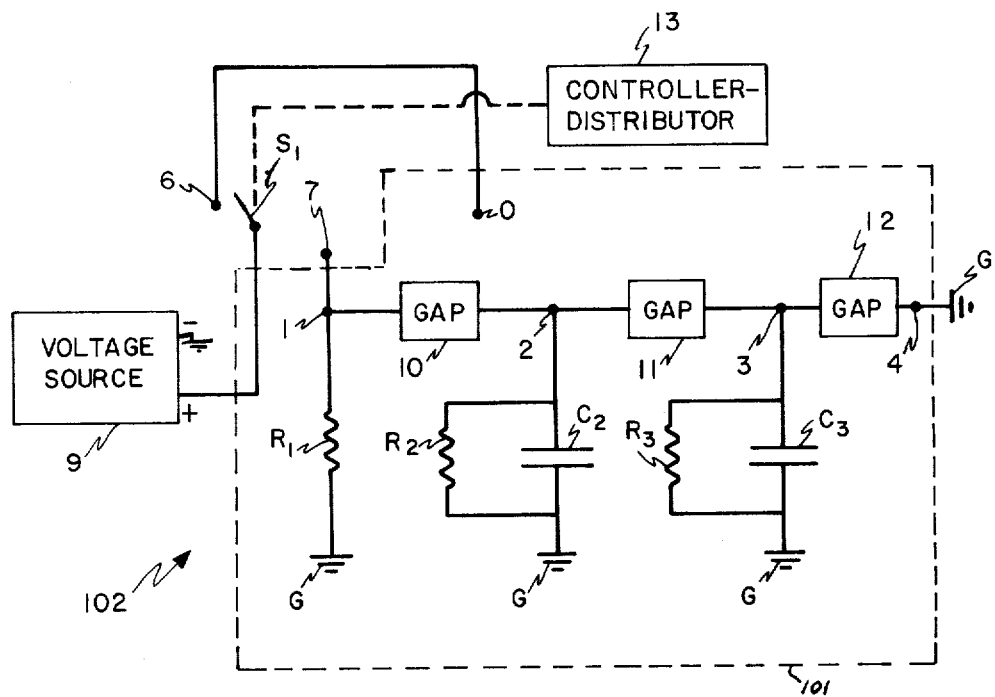
FIG. 2 is a schematic circuit diagram showing the spark plug of FIG. 1 schematically together with a voltage source, switch and controller to effect the appropriate collection and sparking functions herein described.

There follows now a brief explanation of the spark plug shown at 101 in FIGS. 1 and 2, which is adapted to perform the functions herein disclosed, when properly electrically activated by the further circuit elements in the system designated 102 in FIG. 2. The spark plug 101 comprises a central discharge electrode 0 (also referred to herein as a corona electrode or inner corona electrode) and peripheral electrode means comprising a plurality of arcuate electrodes 1, 2, and 3 (also referred to as outer corona electrodes) and a grounding electrode 4; there are, as shown, respective gaps 10, 11 and 12 between electrodes of the latter group or array. The electrodes 2 and 3 are floating electrodes capacitively coupled to ground and in this embodiment are arcuate and are disposed along a circular path of radius R about the central electrode 0. In a collecting mode of spark plug operation a switch $S_1$ in FIG. 2 is closed by a controller or distributor 13 upon contact point 6 thereby to create a potential difference between the central electrode 0 and the array of electrodes 1-4. This potential difference comes from a high voltage source 9 and said potential difference establishes a corona discharge between the corona electrode 0 and the array of electrodes 1-4. In the collecting mode, as later noted, fuel droplets in the fuel-air mixture receive an electric charge and migrate under the influence of the electric field between the corona electrode 0 and the oppositely charged array of electrodes, toward said array. When the fuel droplets have congregated in the vicinity of the array, thereby enriching the fuel-air mixture there, the switch $S_1$ is moved under the influence of the controller or distributor 13 over to the contact point numbered 7 to establish a sparking mode of operation. In the sparking mode, as later discussed, an arc will travel across the gap 10, then the gap 11 and then the gap 12, thereby igniting the enriched mixture which is in the vicinity of the electrode array, where ideally it should be. The controller or distributor 13 sequences the events.

Figure 3:
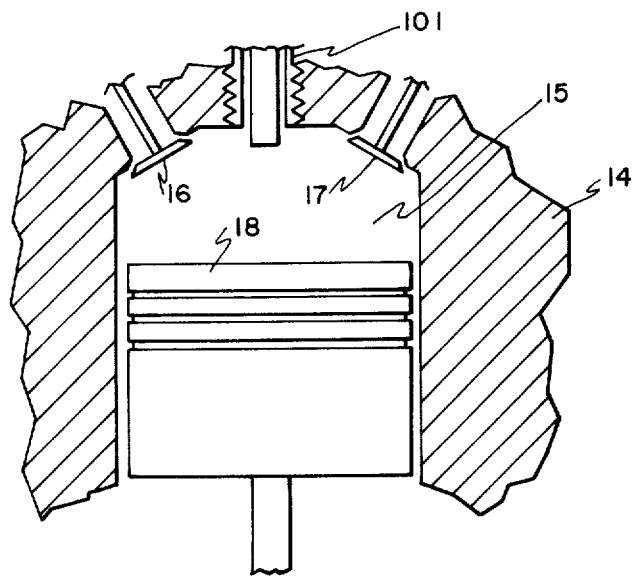
FIG. 3 is a partial section view showing one cylinder of an internal combustion engine with a spark plug of the type shown in FIG. 1 to effect ignition.

The spark plug includes, further, capacitances $C_2$ and $C_3$ between the electrodes 2 and 3, respectively, and ground G. The electrodes 2 and 3 are floating electrodes coupled to ground through the capacitances $C_2$, $C_3$ and resistors $R_2$ and $R_3$. (Here ground denotes a common connection through the engine block and frame of the automobile or other vehicle within which the spark plug is installed.) The bypass resistors $R_2$ and $R_3$ and a further resistor $R_1$ (of the order of 1 megohm) serve to leak charge from the electrodes 2, 3 and 1, respectively, during the collecting mode, as now explained. FIG. 3 shows one cylinder 15, of the engine of an automobile or other vehicle, the engine being labeled 14. There are intake and exhaust valves 16 and 17 and a piston 18. As is known, a fuel-air mixture is drawn into the cylinder chamber 15 on the intake stroke at a reduced pressure. At about that juncture of the cycle the switch $S_1$ is closed creating a radial field between the electrode 0 and the electrode array 1-4. The electrode 0, as a result of the amplitude of applied voltage, acts to create a corona discharge in the radial space around it of sufficient intensity to charge the fuel droplets, as is done in electrostatic precipitation, but not of high enough current density to ignite the droplets. In order to limit the corona current and to prevent arcing from the corona electrode, the corona electrode can be covered with an insulating material—for example, a ceramic capable of withstanding the high temperatures and mechanical shocks associated with ignition. Further current limiting means may be used such as an inductor in series with the corona electrode. The charged droplets move radially outward in FIG. 1 under the influence of the electric field which is associated with the corona discharge from the electrode 0 to the region in the vicinity of the peripheral electrodes 1-4, thus increasing the fuel-air ratio near the outer electrodes to provide a stratified charge. The single-pole, double-throw switch $S_1$ is then switched over to the contact 7 in the sparking mode. At this juncture, the first sparking electrode 1 has a high magnitude voltage with respect to ground applied to it and that voltage breaks down the gap 10 with an arc to the second arcuate electrode 2, charging the capacitance $C_2$; when the capacitance $C_2$ is charged to some level, the gap 11 breaks down to the third arcuate electrode 3, etc., the travelling arc finally terminating at the electrode 4. More electrodes and gaps than shown can be employed. This process is termed herein a travelling arc discharge. It has been found for present purposes that in the collecting mode there can be a charge build-up due to the corona current on the collecting and sparking electrodes 1, 2 and 3. To prevent such build-up and consequent loss in collecting efficiency, the resistors $R_1$, $R_2$, and $R_3$ are used to leak that charge away. There is in this way created a large ignited zone in the region about the peripheral electrodes 1-4, which spreads to the remaining fuel-air mixture in the cylinder 15. The remaining mixture can be quite lean, an ideal situation for reducing pollutants. Further, since the droplets in the vicinity of the collecting electrode array, which still retain their charge, are all charged with the same charge, they will tend to repel one another, thus acting to create a uniform dispersion in the arcing zone and, therefore, fast and uniform ignition. Also, the ignition of the remaining mixture takes place over a large area; hence uniformity of combustion is assured. The further parts of the spark plug 101 are conventional and include a metal base 19, an electrical contact 20 which is electrically connected to the central electrode 0 by an internal conductor (not shown) and isolated from other working parts by an insulator 21.

A complete discussion of the corona discharge and its use in the process of electrostatic precipitation can be found in the White text. It is shown in White's book that the particle size to be expected in a mist range from 10–100μ diameter and that range is assumed to be the droplet size in the fuel-air mixture of a combustion engine. The particle charge acquired in a corona increases rapidly with diameter, going from $30\epsilon$ for a 1μ drop to $30 \times 10^{+3}$ for a 10μ drop. Hence, fuel droplets can be highly charged by a corona. The steady-state velocity reached in an electric field occurs when the viscous force balances the accelerating force of the applied electric field. Particle velocity increases with particle diameter $\bar{a}$ with $10\mu$ particles reaching roughly 3 ft/sec or about 100 cm/sec and a $50\mu$ particle moving 16 ft/sec or 500 cm/sec. The droplet charging time $t_o'$ in the corona is of the order $2 \times 10^{-3}$ sec. Table 1 is taken from Chapter V of White. The interesting result is that the larger particles charge faster and to a greater saturation charge $n_s$.

Table I

| $E_o$, kv/cm | a | $n_s$ | K, cm/sec/ volt/cm | $N_o$, ions/cm³ | $t_o$, sec |
|---|---|---|---|---|---|
| 1 | 0.1 | 2 | 1 | $10^7$ | 0.2 |
| 10 | 0.1 | 20 | 1 | $10^8$ | 0.02 |
| 1 | 1.0 | $2 \times 10^2$ | 1 | $10^9$ | 0.002 |
| 10 | 1.0 | $2 \times 10^3$ | 10 | $10^7$ | 0.02 |
| 1 | 10.0 | $2 \times 10^4$ | 10 | $10^8$ | 0.002 |
| 10 | 10.0 | $2 \times 10^5$ | 10 | $10^9$ | 0.0002 |

The velocities and times are very favorable for fuel droplet concentration in the cylinder of an internal combustion engine.

At 6000 rpm, the maximum probable engine speed, the intake stroke requires $5 \times 10^{-3}$ seconds and the compression stroke $5 \times 10^{-3}$ seconds. In 5 ms, $10\mu$ drops can be moved in a charging field of 5 kV/cm, approximately 0.5 cm. These distances are of the order of the radius of a conventional spark plug and they represent the minimum distances. At slower engine speeds and especially at cranking speeds at engine start, the electrostatic motion of fuel droplets would hardly be a limiting factor. The electric power consumed in electrostatic precipitation is minimal. For example, White calculates the work done to remove all the particles in 1 cu ft of a fairly dense aerosol to be $3.1 \times 10^{-1}$ joules. For the purposes of electrostatically concentrating the fuel droplets in the vicinity of the sparking electrode of a spark plug, one is dealing with a few cm³ at best.

Consideration is now given to the electric field required to obtain the corona. During the intake stroke the pressure within the cylinder is a little less than atmospheric. The current $i$ in the corona varies as $$i = i_o e^{\alpha r} \qquad (1)$$

where $x$ is the distance from the negative electrode, $\alpha$ is the first Townsend ionization coefficient and it is related to gas pressure $p$ by $$\frac{\alpha}{p} = f\left(\frac{E}{p}\right) \qquad (2)$$

where $E$ is the electric field intensity. The coefficient $\alpha$ is relatively high for hydrocarbons, i.e., they are easy to charge.

The corona starting voltage $V_o$ is given by the Peek equation for a coaxial electrode arrangement $$V_o = (30\, a\delta + 9\sqrt{a\delta}\,)\log \frac{b}{a} \qquad (3)$$

where $V_o$ is in kilovolts and is the output voltage of the source 9 for the collecting mode, $a$ and $b$ (the inner and outer corona electrode diameters) are in cm, and $\delta$ is the gas density. At atmospheric pressure a corona can be established with an applied voltage for a concentric cylindrical structure of dimensions typical of a standard spark plug, i.e., < 2 cm outer diameter, using roughly 10 kV. Thus, during the intake stroke when the cylinder pressure is near 1 atmosphere, a corona can be set up using practical voltages for an automobile. During this time and for the first part of the compression stroke the action of electrostatic precipitation will concentrate fuel droplets at the surface of the outer concentric cylindrical-like collecting electrodes 1–4. As the pressure rises during compression, the corona is extinguished. The sparking electrodes 2 and 3, as shown in FIG. 1, each form a part of one side of a capacitor shown as $C_2$ and $C_3$. There is leakage to ground across each capacitor characterized by leakage resistances $R_2$ and $R_3$ which are in series with the effective resistance of the corona. In a test structure it was found that with a leakage resistance of $10^6$ ohms for $R_2$ and $R_3$, the leakage current across the capacitors is sufficient so that the capacitors do not charge up and block the corona. But this resistance is also large enough so that a travelling arc discharge can also be created. The resistances $R_1$, $R_2$ and $R_3$ can be adjusted to establish the proper level of drain. Furthermore, the central corona electrode 0, as noted, can be coated with an insulator such as a ceramic or can be put in series with an inductor L (as later explained; see FIG. 4) to suppress arcing from the corona electrode.

Figure 4:
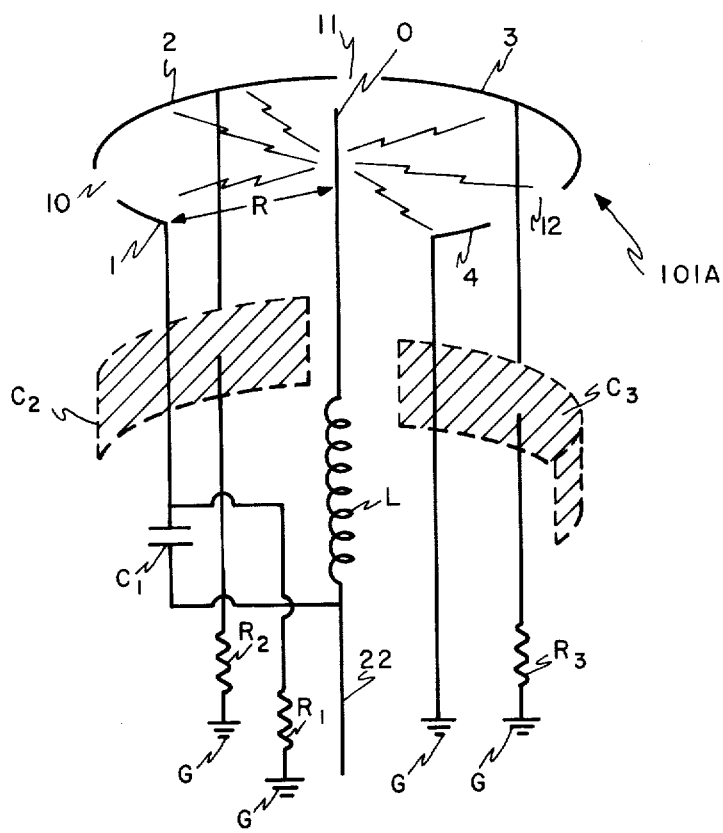
FIG. 4 is an isometric schematic of a modification of the spark plug of FIG. 1.

The spark plug shown schematically at 101A in FIG. 4 is a slightly different version of the plug 101 and can be used to permit a single electrical connection through the lead labeled 22 to be applied, the further connection being the engine, etc., marked G, as before. The arrangement in FIG. 4 permits a single voltage waveform such as that shown in FIG. 6 to be applied to the input lead 22; the plug 101A functions in the manner explained below.

With regard to the spark plug 101A (and 101) two separate types of discharge take place, the corona discharge during the intake stroke and perhaps part of the compression stroke and the spark as an arc discharge which serves to ignite the concentrated fuel-air mixture. One means of bringing about the appropriate discharge between the correct set of electrodes is as follows.

Figure 6:
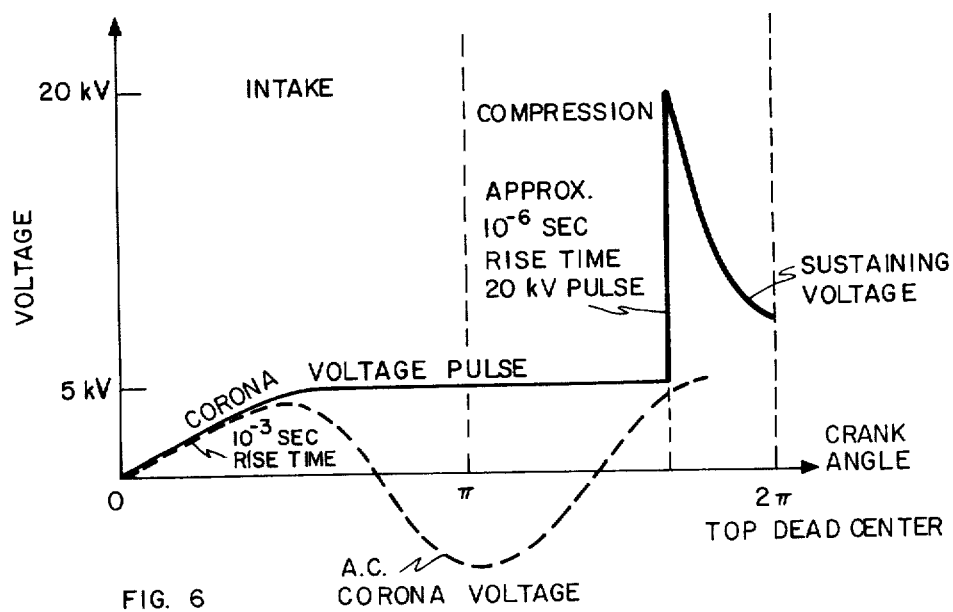
FIG. 6 is a graph of voltage as a function of crank angle of a combustion engine, the voltage curve shown being a typical curve for a voltage source that might be used in connection with the spark plug shown in FIG. 4.

The corona electrode 0 can be connected in series with a high inductance L and the arcing electrode 1 in series with a capacitance $C_1$ or an air gap. The inductance L and the capacitance $C_1$ can be characterized as putting a low-pass filter (i.e., the inductance L) in series with the corona discharge electrode 0 and a high pass filter (i.e., the capacitance $C_1$) in series with the arcing electrode 1. The air gap (or the capacitance $C_1$) acts as a high voltage switch that blocks current until the voltage difference across the gap exceeds the breakdown threshold. Above threshold the air gap acts like a short. The rise time of the corona voltage in FIG. 6 is of the order of $10^{-3}$ seconds and the rise time of the arcing voltage is about $10^{-6}$ seconds. The corona voltage is of the order of 5 kV and the sparking voltage of the order of 20 kV. A constant corona voltage can also be used.

Figure 5:
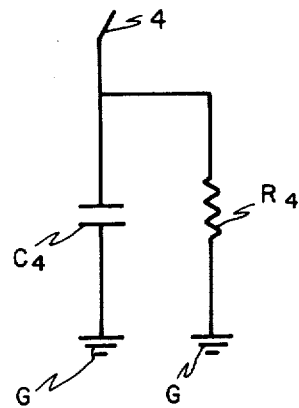
FIG. 5 shows schematically a modification of a portion of the spark plug of FIG. 4.

The capacitor $C_1$, as noted, can be an air gap as shown, connecting the high voltage supply to the sparking electrode 1; the gap breakdown threshold voltage is adjusted so that 5 kV cannot break it down. Thus, the sparking electrode 1 is isolated from the 5 kV corona voltage. The corona goes from the central discharge electrode 0 to the arcuate electrodes. When the cylinder pressure rises on compression, the corona is extinguished. (it could also be extinguished by a controller such as 13 of FIG. 2). At the appropriate crank angle during compression, a fast rise time ($\sim 10^{-6}$ seconds) high voltage pulse ($\sim 20$ kV) comes to the plug from the high voltage supply which can be a capacitive ignition system which is characterized by very fast rise times. The fast pulse is blocked by the inductance L from creating a breakdown at the corona electrode 0. An inductance L, say, of $10^{-1}$ henrys or better with a very fast time pulse, can be employed. The fast, high voltage pulse breaks down the air gap (i.e., the capacitance $C_1$) in series with the sparking electrode 1, following which the spark gap 10 breaks down. The capacitor $C_2$ associated with the electrode 2 charges up and spark gap 11 breaks down to the electrode 3. Then capacitor $C_3$ associated with the electrode 3 charges up and gap 12 breaks down to the ground return pin 4. It may be advantageous to have an air gap $C_4$ and bleeding resistor $R_4$ associated with the ground return pin 4 as shown in FIG. 5. The corona voltage is shown as a slow-rising corona pulse followed by a fast rising, slower falling, arcing pulse. The corona voltage pulse can be d-c or it can be a-c.

Figure 7:
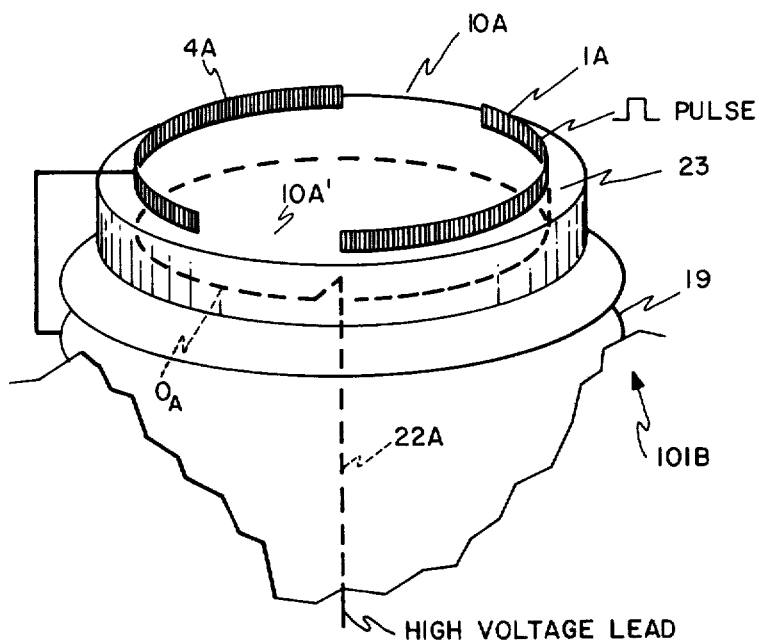
FIG. 7 is an isometric diagrammatic representation of a portion of a modification of the spark plug of FIG. 1.

The plug shown somewhat schematically at 101B in FIG. 7 comprises a circular corona electrode $0_A$ that is connected (in the illustrative embodiment of FIG. 7) to a high voltage lead 22A, and further electrode 1A. The electrode 4A is connected to the plug body 19 and the electrode 1A is connected to electrode $0_A$. By way of example, the electrodes $0_A$ and 1A can be connected to the negative side of a high voltage source of electric potential and the electrode 4A to the positive side thereof which is at ground. Insulation is provided by a quartz or ceramic layer 23. (The electrical connection to the electrode 1A is internal.) A voltage pulse applied to the high voltage lead 22A will result in a corona discharge between the electrodes $0_A$ and 1A and the electrode 4A and an arc discharge across gaps 10A and 10A'. It has been found, for example, that an arc the order of 1 centimeter can be effected at 10 atmospheres with a 10 kV potential; the voltage is lower than one would expect from prior work because at the lower pressure of 2 to 3 atmospheres used in such prior work, the required potential needed increased linearly with pressure; it has been found for present purposes that such requirement does not prevail from pressures of about 4 atmospheres to pressures the order of 10 atmospheres, the latter being the pressure of interest in combustion engines.

Figure 9:
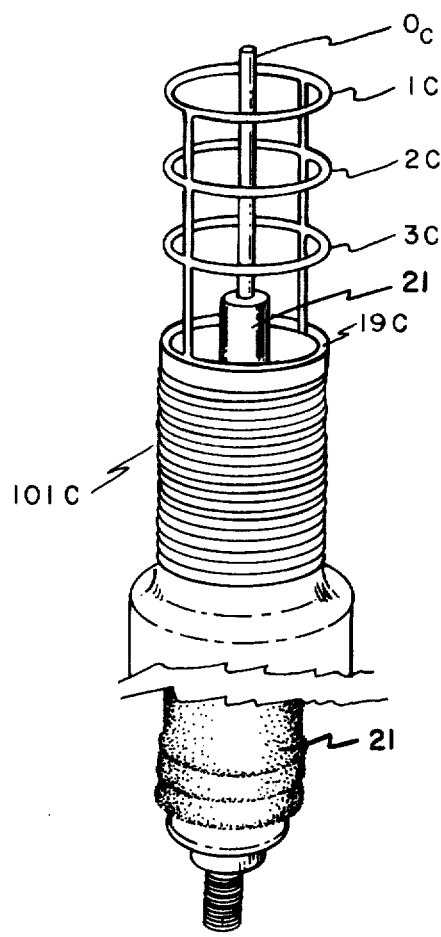
FIG. 9 is an isometric view of a modification of the spark plug in FIG. 1.

A further spark plug or lean mixture ignition device is shown at 101C in FIG. 9. The plug 101C has a corona electrode $0_C$ along the axis of a cylindrical collecting electrode in the form of a cage comprising rings 1C, 2C and 3C which are electrically shorted together and to the plug body labeled 19C. The space between the rings 1C, 2C and 3C is open. A voltage is applied to the corona electrode $0_C$ at a terminal 20C from a high voltage source, as before, under the direction of a controller or distributor, not shown. The voltage applied is a waveform similar to that shown in FIG. 6. First a corona voltage is supplied of the order of 5 kV for the purpose of charging the collecting fuel droplets in the vicinity of the collecting rings 1C, 2C and 3C. At the appropriate crank angle, a higher voltage is applied to the corona electrode $0_C$ causing an arc to form between that electrode and the collecting electrode, the corona electrode thusly playing the role of arcing electrode as well.

In the systems described above, the corona discharge is used primarily as a mechanism for enriching or stratification of the fuel-air mixture. The corona can also play the role of enabling an arc discharge to be established between electrodes at lower potential differences and with larger electrode separation. Flash tubes such as described in the Edgerton text take advantage of these properties. Furthermore, the combination of the corona and travelling arc discharge can be used to make a flash tube with sequential arcs between the floating electrodes. These floating electrodes can be in a linear array, a two-dimensional array, or in a three-dimensional array. The sequential arcs provide a series of light flashes spaced in time according to the RC charging time of the capacitors associated with the floating electrodes. These times may be in the $10^{-7}$ to $10^{-8}$ second range. Such a series of flashes would form the basis for an ultra fast stroboscopic light source.

Figure 8:
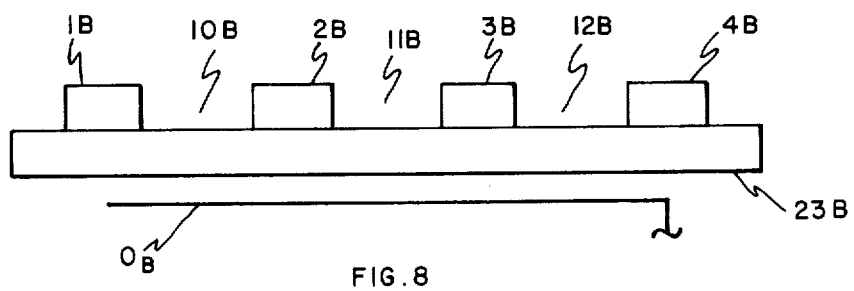
FIG. 8 is a side view of a discharge device.

In FIG. 8 a high voltage (e.g., 18 kV) is maintained between a first electrode 1B and a ground electrode 4B. The gaps shown at 10B, 11B, and 12B are of the order of 1 inch for a 18 kV applied voltage. Floating electrodes 2B and 3B are capacitively coupled to a "stinger" electrode $0_B$ through an insulating layer 23B which also acts as a leakage resistor between the floating electrodes and the stinger electrode. When the stinger electrode is pulsed to a high voltage of the order of 40kV with respect to ground, a travelling arc discharge goes from electrode 1B to 2B to 3B to 4B. It should be appreciated on the basis of the detailed explanation herein that the number of intermediate electrodes can be increased beyond the two shown and that other spatial patterns can be used. This device was found to operate at 10 atmospheres using nearly the same voltages as required at 1 atmosphere.

Figure 10:
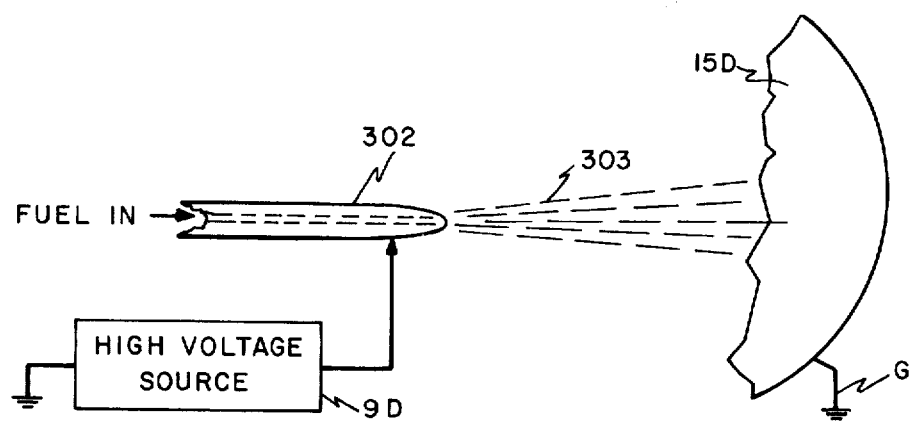
FIG. 10 is a schematic, partly in block diagram form, of a scheme whereby droplets introduced to the combustion chamber of a turbine or the like, are charged.

The concept of controlling the motion of fuel droplets by electrostatic forces consequent to the charging of these fuel droplets in a corona discharge can be used in a variety of ways to control the combustion process. For example, in a jet or turbine engine it can be used to achieve uniform mixing of the fuel droplets due to the coulomb repulsion between the droplets when they are charged. This is important for the purpose of achieving an even burning flame and without excessive temperature differences. Such a system is shown in FIG. 10. Fuel is injected through a nozzle 302 which is maintained at a large potential difference from ground by the high voltage source 9D. The nozzle acts as a corona electrode. The fuel spray designated 303 is evenly dispersed as it is directed into a combustion region 15D. Combustion may be effected by a flame already present in the combustion region as would be the case in a jet or turbine engine. An alternate means would be injection of the fuel into a region in which a corona discharge is established and then into the combustion region.

Further modifications of the invention herein disclosed will occur to persons skilled in the art and all such modifications are deemed to be within the spirit and scope of the invention as defined by the appended claims.

What is claimed is:

1. For use in an internal combustion engine, a spark plug having a high-field, corona electrode centrally located in the ignition zone of the spark plug, a ground electrode separated radially from the corona electrode a distance R, and a plurality of arcuate electrodes located along a circular path around the corona electrode at said radius R therefrom, the arcuate electrodes being separated from one another and from the ground electrode, the geometry being such that a corona discharge can be created in the space between the central high-field corona electrode and the arcuate electrodes of sufficiently low energy to charge fuel droplets in said space but not to ignite the same, the charged droplets being moved under the influence of the electric field creating the corona discharge toward and concentrated in the vicinity of said circular path to be ignited there by an arc between the arcuate electrodes and between one of the arcuate electrodes and the ground electrode.

2. A spark plug for igniting a fuel-air mixture, that comprises, corona electrode means for charging fuel droplets in the fuel-air mixture, collecting and sparking electrode means for concentrating the fuel droplets in a collecting mode and for igniting the fuel droplets in a fuel ignition mode, the geometry of the collecting and sparking electrode means being such that an enriched region of fuel-air mixture is provided that is extended in space and provides a large ignition zone.

3. A spark plug as claimed in claim 2 in which the corona electrode means is a centrally located corona electrode and in which the collecting and sparking electrode means comprises a plurality of travelling arc arcuate electrodes positioned about the discharge electrode.

4. A spark plug as claimed in claim 3 in which the collecting and sparking electrode means includes a grounding electrode connected to the base of the spark plug that serves as a common ground connection.

5. A spark plug as claimed in claim 3 in which at least some of the arcuate electrodes are connected to said common ground connection through capacitance means.

6. A spark plug as claimed in claim 5 in which the arcuate electrodes are connected to aid common ground connection through a high resistance.

7. A spark plug as claimed in claim 2 having a base that serves to ground the spark plug in an operating system and in which the collecting electrode means comprises a plurality of collecting electrodes at least one of which is grounded to the base and at least one of which is a floating electrode connected to said base through impedance means.

8. The spark plug as claimed in claim 7 wherein the impedance means comprises a high resistance.

9. A spark plug as claimed in claim 7 wherein the impedance means is a capacitance.

10. A spark plug having, in combination: multiple-gap, serially disposed, electrode means that comprises a sparking electrode, at least one floating electrode and ground electrode means; and a resistance and capacitance in combination connected to couple said at least one floating electrode to ground.

11. A spark plug as claimed in claim 10 wherein the d.c. resistance of the combination is the order of one megohm or more.

12. A spark plug as claimed in claim 7 wherein the corona means comprises a corona electrode and that includes an inductance connected in series with the corona electrode to provide a low pass filter thereto.

13. A spark plug as claimed in claim 2 wherein the corona electrode means comprises a corona electrode centrally located in the ignition zone of the spark plug and in which the collecting and sparking electrode means comprises a ground electrode separated radially from the corona electrode a distance R and a plurality of floating electrodes located along a circular path around the corona electrode at a radius R therefrom, the electrode geometry being such that a corona discharge can be created in the space between the central corona electrode and the ground electrode and the floating electrodes to charge fuel droplets in said space but not to ignite the same, the charged droplets being moved under the influence of the electric field creating the corona discharge toward and concentrated in the vicinity of said circular path to be ignited thereby arc between the ground electrode and a floating electrode and between floating electrodes.

14. A spark plug as claimed in claim 2 in which the spacing of the electrodes that form the corona electrode means and the collecting and sparking electrode means is such that an arc will form in the presence of a corona discharge but not in the absence of a corona discharge and at pressures normally encountered in a combustion system environment in which the spark plug is used.

15. A spark plug as claimed in claim 11 wherein the impedance means is a resistance and capacitance in combination connected to couple said at least one floating electrode to ground.

16. A spark plug as claimed in claim 15 wherein the capacitance and the resistance are connected in parallel in the form of an RC circuit wherein the resistance serves to leak away charge slowly to ground to prevent buildup of charge in the capacitance.

17. A spark plug as claimed in claim 10 wherein the capacitance is connected between the said at least one floating electrode and ground and in which the resistance is connected in parallel with the capacitance to form an RC circuit to prevent charge buildup on the said at least one floating electrode.

18. A spark plug as claimed in claim 2 having a centrally located discharge electrode and an outer cylindrical electrode in the form of a cage, the centrally located electrode and the cylindrical electrode serving, in combination in an operating system, to charge the fuel droplets, to collect the fuel droplets about the cylindrical electrode to provide an enriched mixture and to ignite the thusly enriched mixture.

* * * * *